United States Patent [19]

Bennett et al.

[11] 4,335,611

[45] Jun. 22, 1982

[54] ACCELEROMETER

[75] Inventors: Robert S. Bennett, Beaconsfield; William E. Griffiths, Middleton, both of England

[73] Assignee: Ferranti Limited, Cheadle, England

[21] Appl. No.: 154,859

[22] Filed: May 30, 1980

[30] Foreign Application Priority Data

Jun. 1, 1979 [GB] United Kingdom ............... 7919226

[51] Int. Cl.$^3$ ............................................. G01P 15/13
[52] U.S. Cl. ................................................ 73/517 B
[58] Field of Search ............ 73/516 R, 517 R, 517 B, 73/510, 653, 655

[56] References Cited

U.S. PATENT DOCUMENTS

| 2,940,306 | 6/1960 | Lozier | 73/517 R X |
| 2,946,226 | 7/1960 | Wendt et al. | 73/517 B |
| 2,979,960 | 4/1961 | Johnson | 73/517 R |
| 3,062,059 | 11/1962 | Singleton | 73/517 B |
| 3,295,378 | 1/1967 | Hirtreiter | 73/517 B |
| 3,459,053 | 8/1969 | Grimme et al. | 73/517 R |
| 3,494,204 | 2/1970 | Whitehead | 73/517 B |

Primary Examiner—James J. Gill
Attorney, Agent, or Firm—Kerkam, Stowell, Kondracki & Clarke

[57] ABSTRACT

An accelerometer comprises an electric coil pivotally mounted in a magnetic field about an axis extending perpendicular to the field for oscillatory movement substantially perpendicular to the field, in the manner of a D'Arsonval movement. Switching means in the form of a radition source and detector responds to movement of the coil assembly when on either side of a switching position to apply a constant current to the coil to move it in the direction of the switching position, thereby setting up an oscillation of the coil. Linear acceleration is measured by having an inertial mass, such as provided by mounting the coil away from its center of mass, displaced from the pivotal axis. An acceleration force acting on the mass of the oscillating coil alters the proportion of time spent at each side of the switching position to give an average current flow in the coil related to the magnitude of acceleration. More than one coil may be provided to measure acceleration along a number of axes.

18 Claims, 8 Drawing Figures

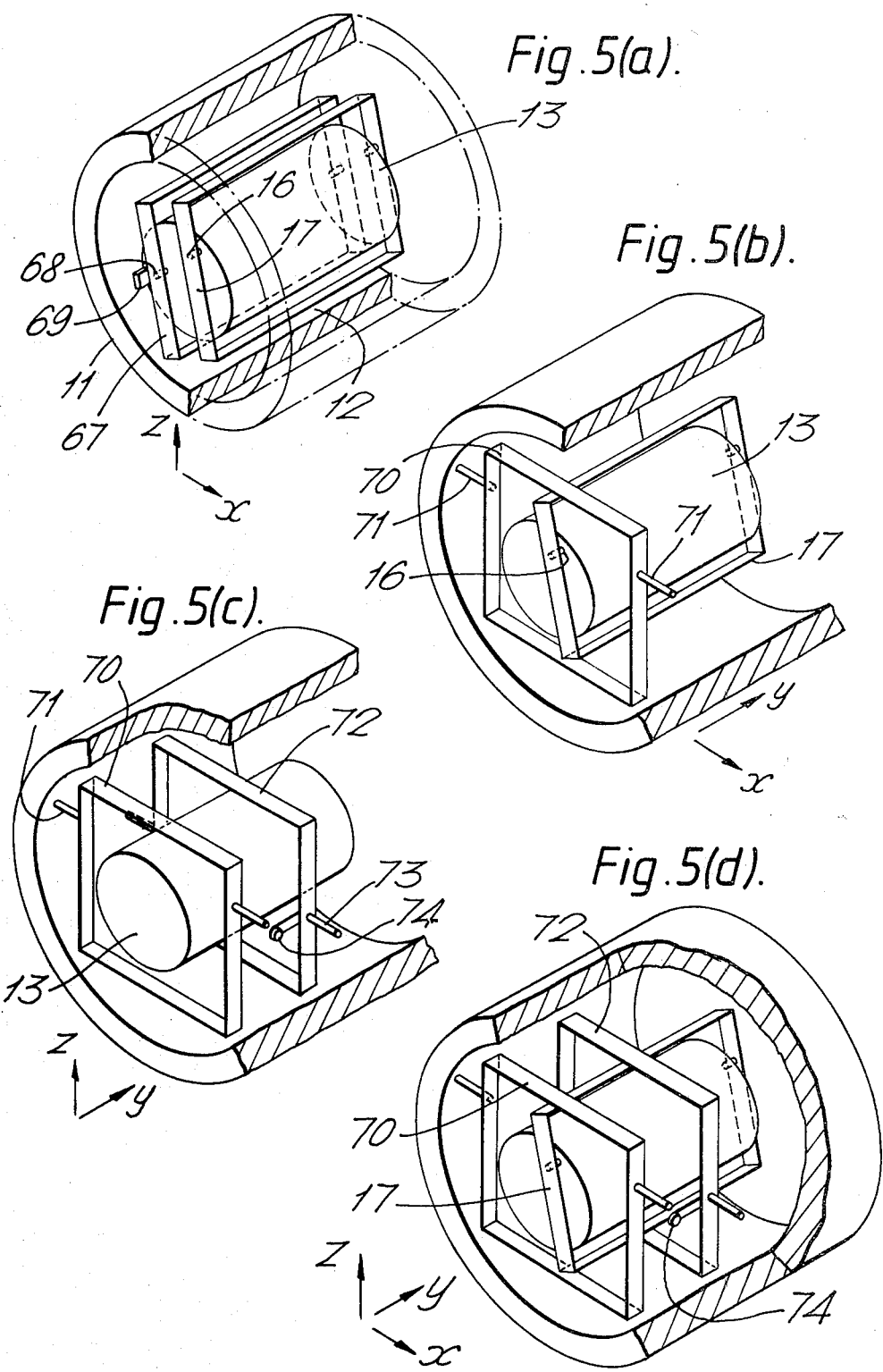

ACCELEROMETER

This invention relates to accelerometers and in particular to accelerometers of the force balance type.

A force balance accelerometer of simple construction is described in our British Pat. No. 1,362,121 which comprises means for producing a uniform magnetic field and an electric coil pivotally mounted in the field for rotation perpendicular to the field about an axis also perpendicular to the field. Such an arrangement is provided by a D'Arsonval type of movement and further comprises an inertial mass fixed in relation to the coil and displaced from the axis of rotation. The mass is arranged to rest in a stable position, either by gravity or restoring springs, such that no current flows in the coil but is arranged such that displacement of the mass from the stable position through a predetermined angular distance operates switching means to cause a current to flow in the coil to rotate the coil in such a sense as to oppose the angular movement. In operation this means that any acceleration force acting on the mass and displacing it causes a repetitive make-and-break operation of the switching means, the average time for which the switching means is made (and therefore average current flow) being proportional to the average acceleration value.

The accelerometer is intended to be set up where possible with gravity defining the stable position of the inertial mass. In situations where gravity cannot be relied upon to restore the inertial mass to a stable position, for example, in outer space, free fall to earth, or when the attitude cannot be accurately set, springs or a bias current have to be employed. Such restoring forces are present for all acceleration force values and introduce a non-linearity in the response, for instance, restoring spring stiffness is temperature dependent, making compensation for them difficult. At any temperature restoring springs have stiffness of finite value which limits how small an inertial mass can be used to measure high values of acceleration.

Furthermore because the mass is required initially to move from a stable rest position through a predetermined angular distance, static friction must be overcome to commence operation. This may be particularly disadvantageous where low acceleration levels are to be measured and where in order to maintain operation at high acceleration values a large inertial mass is unsuitable.

However the fact that the inertial mass has a stable rest position means that at least until disturbed to initiate operation little power is drawn from a supply and the device can be left in quiescent "waiting" condition for long periods.

Proposals have been made for accelerometers employng such rotatable coils but seeking to eliminate problems associated with restoring spring stiffness and dead space in the switch by having no restoring forces but a coil current proportional to the displacement of the inertial mass from a null position (which may be mechanically unstable). Any tendency for the inertial mass to move from the null position is countered after an infinitesimal displacement by increased current flow in the coil which prevents any measurable displacement. However, because movement has, at least, to be commenced before restoring current flows the problem of static friction still applies. Devices of this type are described in British Patent Specification No. 715,750 and U. S. Pat. Spec. Nos. 3,295,378 and 3,494,204.

It is an object of the present invention to provide a force-balance accelerometer of simple construction which has an improved range of operation by mitigating some or all of the above disadvantages.

According to the present invention a force balance accelerometer comprises means for producing a magnetic field, an electric coil assembly forming at least a part of an inertial mass, pivotally mounted in the field for rotation substantially perpendicular to the field about an axis also perpendicular to the field and electric switching means, arranged to be in a first state when the angular position of the coil is to one side of a switching position and in a second state when the coil is to the other side, said switching means being operable in the first state to cause a first substantially constant current to flow in the coil in a sense to rotate the coil in a direction to cause the switching means to enter the second state and operable in the second state to cause a second substantially constant current to flow in the coil in such a sense as to rotate the coil in a direction to cause the switching means to enter the first state.

The coil assembly may have a centre of mass in the plane of the coil and lying on the pivotal axis to be sensitive to angular rotation of the accelerometer about the pivotal axis or may have its centre of mass in the plane of the coil and displaced from the pivotal axis to be sensitive to acceleration acting in a direction perpendicular to the plane of the coil.

In this latter role the coil assembly may be arranged with the pivotal axis displaced from its geometric centre such that the coil assembly comprises the inertial mass acting substantially at the geometric centre of the coil. Alternatively, the coil assembly may have the pivotal axis passing through the geometric centre of the coil assembly and may carry an inertial mass in the plane of the coil displaced from the pivotal axis.

The magnetic field may be formed from a cylindrical core surrounded by a body with an annular airgap between them containing the coil. The core may be a magnet and the body of soft iron or vice versa. The magnetic poles are arranged so as to provide a substantially uniform field in the vicinity of two magnetic poles in diametrically opposed regions of the airgap.

The switching means may comprise a source of electromagnetic radiation and a detector of the radiation reflected by a surface of the core said reflected radiation being blocked or unblocked by movement of the coil at a switching position to effect switching between the first and second state. The part of the core surface concerned may carry a mirror or be polished to enhance reflection. Alternatively the surface of the coil may be made reflective and by a change in the level of radiation reflected by movement of the coil defining the switching position.

The switching means may include a further detection of radiation carried by the body and arranged also to receive reflected radiation unless the radiation is blocked by movement of the coil, said further detector being located such that movement of the coil assembly to block radiation to one detector unblocks radiation to the other detector and vice versa, the position of the coil at which this transition occurs defining the switching position.

Where a single detector is employed the switching means may include a differential amplifier connected as a comparator, one input of the amplifier being connected to the detector to receive signals therefrom and the other input of the amplifier being connected to a threshold signal level whereby the amplifier provides an output signal which changes between two defined levels in dependence on whether the detector signal is greater than, or less than, the threshold level.

Where two detectors are employed the switching means may include a differential amplifier connected to receive signals from the detectors at different inputs whereby the amplifier provides an output signal which changes between two defined levels in dependence on whether one detector signal is greater than, or less than, the other.

In either case the defined levels of the differential amplifier are arranged to be voltages of opposite polarity with respect to earth, and in which the switching means includes driving means comprising a pair of transistors of different conductivity type connected between supply rails of opposite polarity with respect to earth each transistor being arranged to be biased into conduction by a corresponding polarity of amplifier output signal to supply driving current from the associated supply rail to one terminal of the coil, the other terminal of the coil being connected to an output terminal.

Embodiments of the invention will now be described by way of example with reference to the accompanying drawings, in which:

FIGS. 5(a) to 5(d) are diagramatic representations of accelerometers having according to the present invention and sensitive to components of acceleration in more than one axis.

Figure 1:
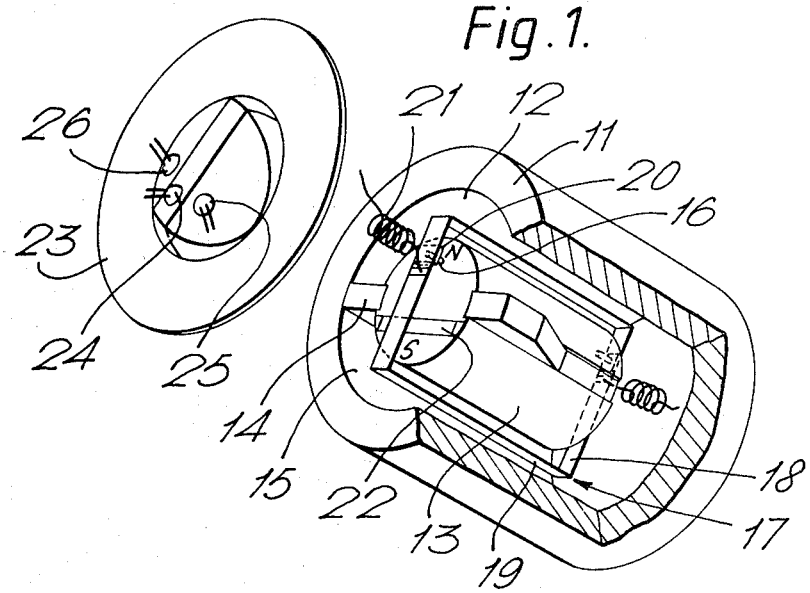
FIG. 1 is a partly sectional perspective view of an accelerometer according to the present invention.

Referring to FIG. 1 an accelerometer comprises a body 11 of soft iron having a cylindrical cavity 12 containing a cylindrical core 13. The core 13 comprises a magnet having poles at diametrically opposite sides designated N and S, and is concentrically mounted within the cavity by aluminium supports 14 so as to leave an annular airgap 15 between the core and the body.

The core has at opposite ends thereof support pivots 16, 16', which pivots are biased outwardly of the core by a spring (not shown) contained in a drilling extending through the core and displaced from the central longitudinal axis of the core. A coil assembly 17 comprising a lightweight former 18 and a multiturn electric coil 19 is supported by the pivots in jewelled bearings 20, such that the coil lies within the magnetic field adjacent the poles of the magnet. Electrical connection are made to the coil by means of flexible "pigtails" 21. The coil assembly is symmetrical in that its centre of mass lies in the plane of the coil and at a point corresponding to the geometric centre of the coil. The coil assembly is mounted on the pivots 16, 16', such that the centre of the coil lies on the longitudinal axis of the core and with the axis of rotation of the coil in the plane of the coil but displaced from the centre of mass of the coil by the displacement of the pivot axis from the longitudinal axis of the core. The mass of the coil assembly thus comprises an inertial mass of the accelerometer to make it sensitive to acceleration forces acting normally to the plane of the coil.

One end of the core 13 is polished or carries a plane mirror 22. The body 11 is adapted to receive an end cap 23 including a switching means in the form of light emitting diode (l.e.d.) 24 arranged to direct a beam of electromagnetic radiation, either visible or infra-red, onto the mirror 22, in a divergent beam at normal incidence, and two photodetectors 25, 26, adjacent the l.e.d. and inclined at an angle to the l.e.d. and to each other to receive radiation of the beam reflected from the mirror 22.

The cap 23 is adjustable in position relative to the end of body such that most of the beam of radiation falls on the section of coil overlying the mirror 22 and only radiation passing each edge of the coil is reflected and detected. The detectors are arranged such that with the coil disposed symmetrically between them in a "switching" position, they are each at the threshold between conduction and non-conduction. For any displacement of the coil permitting an increase of illumination of one detector and a corresponding decrease in illumination of the other, the switching means is considered to be in a first state whereas a displacement permitting a decrease of illumination of said one detector puts the switching means into a second state.

Figure 2:
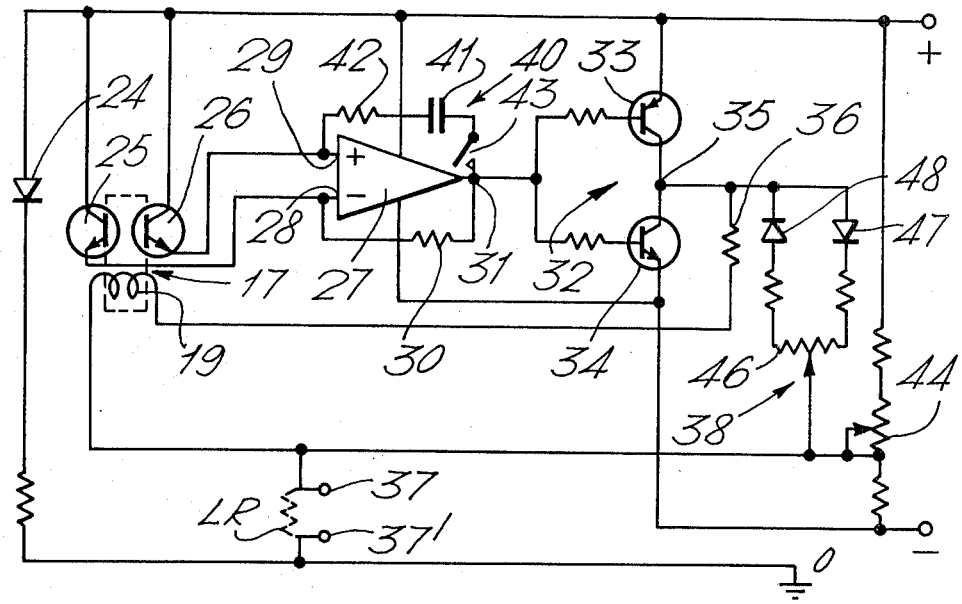
FIG. 2 is a circuit diagram of one form of electrical switching means employed in the accelerometer of the present invention.

Referring now to FIG. 2 which shows the circuit of the switching means the coil 19, l.e.d. 24 and photodetectors 25 and 26 are shown. The circuit also comprise a differential amplifier 27 having inverting and non-inverting input terminals 28 and 29 respectively. The photodetector 25 is connected to amplifier input terminal 28 and the photodetector 26 is connected to amplifier input terminal 29. A feedback resistor 30 between an amplifier output terminal 31 and the inverting input terminal 28 sets the gain of the amplifier. The amplifier output terminal 31 is also connected to driving means 32. This comprises a pair of transistors 33 and 34 of opposite conductivity type connected in series between positive and negative supply rails and each having its base terminal connected by way of a resistor to amplifer output terminal 31. The intermediate, or common collector, point 35 between the transistors is connected by way of resistor 36 to one end of the coil 19. The other end of coil 19 is connected to a circuit output terminal 37 and to a compensation network 38 described hereinafter. The l.e.d. 24 and other output terminal 37' is connected to earth potential.

The gain of amplifier 27 is set sufficiently high that any imbalance between the signals applied to inputs 28 and 29 causes the voltage at output terminal 31 to change polarity between defined levels of ±v volts. Depending on the polarity of the amplifier output signal to either transistor 33 or transistor 34 is brought into conduction and a constant current caused to flow in coil 19, the direction of flow depending upon which driving transistor is conducting. The direction of current flow is arranged such that if, for example, radiation is blocked from photodetector 25 by the coil and photodetector 26 is illuminated, the switching means is in its first state and the amplifier output terminal 31 is maintained at a potential +v (with respect to earth) and driving transistor 34 is caused to conduct in such a sense as to rotate the coil clockwise such that it reduces radiation reaching the photodetector 26 and correspondingly increases the radiation reaching photodetector 25 that is the switching means enters its second state. As soon as the signal from 25 exceeds that from 26 the amplifier output voltage changes from +v to −v and coil driving transistor 35 is caused to conduct and transistor 34 to be turned off, current flow through the coil being reversed and the coil motion reversed to intercept the radiation to phototransistor 25 and reduce it to phototransistor 26 once again.

In the absence of any external forces acting on the coil assembly the coil oscillates between limits determined by the inertial of the coil assembly, the magnitude of the current and the speed of the switching. The times spent in each switch state are equal and a load resistor LR connected between terminals 37 and 37' has an average voltage across it of zero. When the accelerometer is caused to accelerate by a force acting perpendicularly to the plane of the coil assembly the acceleration force on the centre of mass of the coil causes a torque to be applied about the pivotal axis which aids or opposes the alternating torques applied to the coil by the switching means. Although the frequency at which the coil oscillation remains substantially constant the proportion of each oscillation period which the switching means spends in one state increases and the proportion spent in the other decreases, the difference being a measure of the magnitude of the acceleration force. If the time spent in one switch state is T, and in the other state $T_2$, where the period of oscillation is the total $T_1+T_2$, then it can be shown that the acceleration value is proportional to the average of the difference between time intervals $T_1$ and $T_2$. This may be considered either by measuring $(T_1-T_2)$ over a relatively long interval, for example, by applying it to a smoothing circuit or by determining $(T_1-T_2)/(T_1+T_2)$ for each oscillation period.

At this point, having described the accelerometer and its operation which its advantages may be better understood. The principal advantage achieved by continuously oscillating the coil assembly is the obviation of the effects of static friction on the pivots and the stiffness effects of springs for restoring the coil to a stable null position. Also as the switching means is either in one state or another there is no dead-space to influence accuracy. Furthermore because there is no static friction to be overcome a very small inertial mass required for measuring high acceleration values can be employed also for measurement of low acceleration values, enabling the device to respond to a greater range of acceleration values than previous arrangements.

Furthermore the ability to use an inertial mass formed only of a light-seight coil assembly means that the coil is capable of oscillation at a high frequency. A positive feedback network 40 comprising a reactive component, capacitor 41, and resistor 42 in series may be connected, by switch 43, between the amplifier output terminal 31 and noninverting input terminal 29, to force the coil into oscillation at a higher frequency. Forced oscillation at a higher frequency has several effects. Firstly the time intervals over which the proportions of time the switching means is in one stage or the other are smaller so that average acceleration values can be measured over shorter intervals. Secondly the amplitude of oscillation of the coil is smaller and its inertial mass departs less from the plane of the coil at the switching position and is less influenced by acceleration forces acting in other directions. Thirdly, oscillation of the coil at other than its natural or resonant frequency makes the frequency less dependent upon acceleration forces acting.

The circuit shown in FIG. 2 also provides for setting-up adjustments to be made by the aforementioned compensation network 38. The compensation network comprises a potential divider formed between positive and negative supply rails by an adjustable potentiometer 44 connected to the output terminal 37. The tapping point of the potentiometer is also connected to the tapping point of a potentiometer 46 each end of which is connected by way of an oppositely poled diode 47, 48 respectively to the intermediate point 35 of driving transistors 33 and 34. Potentiometer 46 is adjusted in the absense of any acceleration force acting on the inertial mass until equal currents flow in the coil in opposite directions and give a zero output signal. Potentiometer 44 is then adjusted with equal and opposite constant acceleration values acting on the inertial mass to ensure that the supply rails are symmetrically balanced with respect to earth. The two adjustments effect each other and may be repeated if necessary until errors are eliminated.

Figure 3:
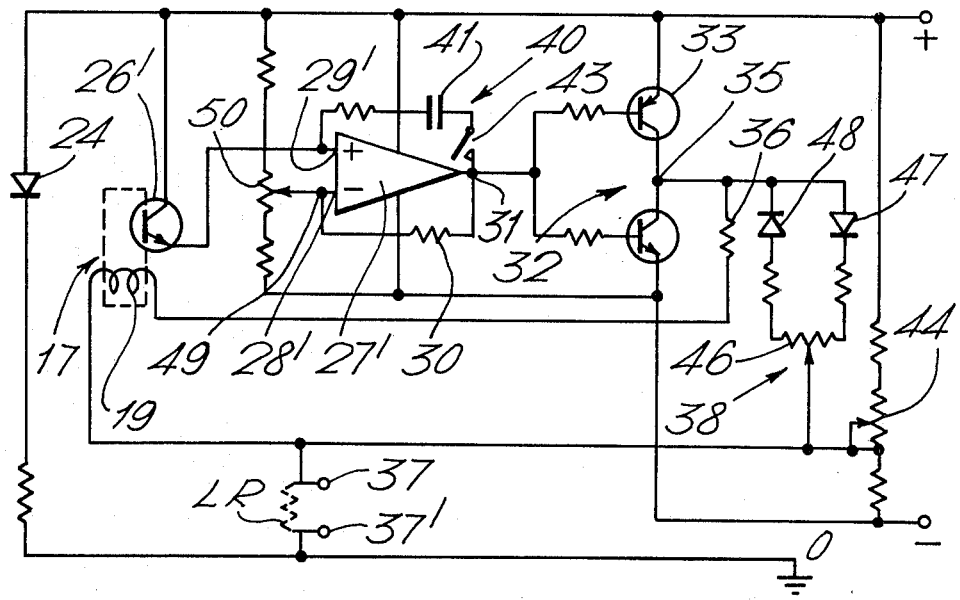
FIG. 3 is a circuit diagram of an alternative form of electrical switching means.

An alternative form of switching means is illustrated in the circuit of FIG. 3 which differs from that of FIG. 2 in that only a single photodetector 26' is used feeding into an input 29' of a differential input amplifier 27'. The other input 28' of the amplifier is connected to the tapping point 49 of a potentiometer 50 connected between positive and negative supply rails. The potentiometer 50 is set to define a threshold signal level for the amplifier such that when the coil blocks radiation from the photodetector the threshold signal causes an amplifier output signal to drive current through the coil to rotate it anti-clockwise, as shown, to unblock the radiation path resulting in a detector signal applied to the amplifier exceeding the threshold level and changing the amplifier output signal level to reverse current flow in the coil, and maintain oscillation.

Although both arrangements of switching means are practicable the arrangement employing two photodetectors is preferred as giving a more clearly defined switching position and being independent of any changes in characteristics of the photodetectors, for example, due to temperature or ambient light, which will affect both equally and be cancelled from the signals applied to the amplifier.

Where the above arrangements have been described with the switching means operated by the interruption of a radiation beam by the coil it will be appreciated that the surface of the coil could be made to reflect with an interchange of connection of the photodetectors to amplifier 27 (or 27').

Similarly the coil assembly has been utilised as the inertial mass by being pivoted away from the centre of the coil. If desired the pivotal axis could be arranged to extend through the centre of the coil, the coil assembly then being arranged to carry an inertial mass displaced from the axis if linear acceleration is to be measured or symmetrically placed about the axis (or absent) if angular acceleration is to be measured. The use of such a separate inertial mass introduces a potential penalty of lower oscillation frequency as discussed herein. While it is convenient to maintain the point of action of the inertial mass in the plane of the coil assembly this is not mandatory and massive body may be carried by an arm or otherwise extending out of the plane of the coil assembly.

Figure 4:
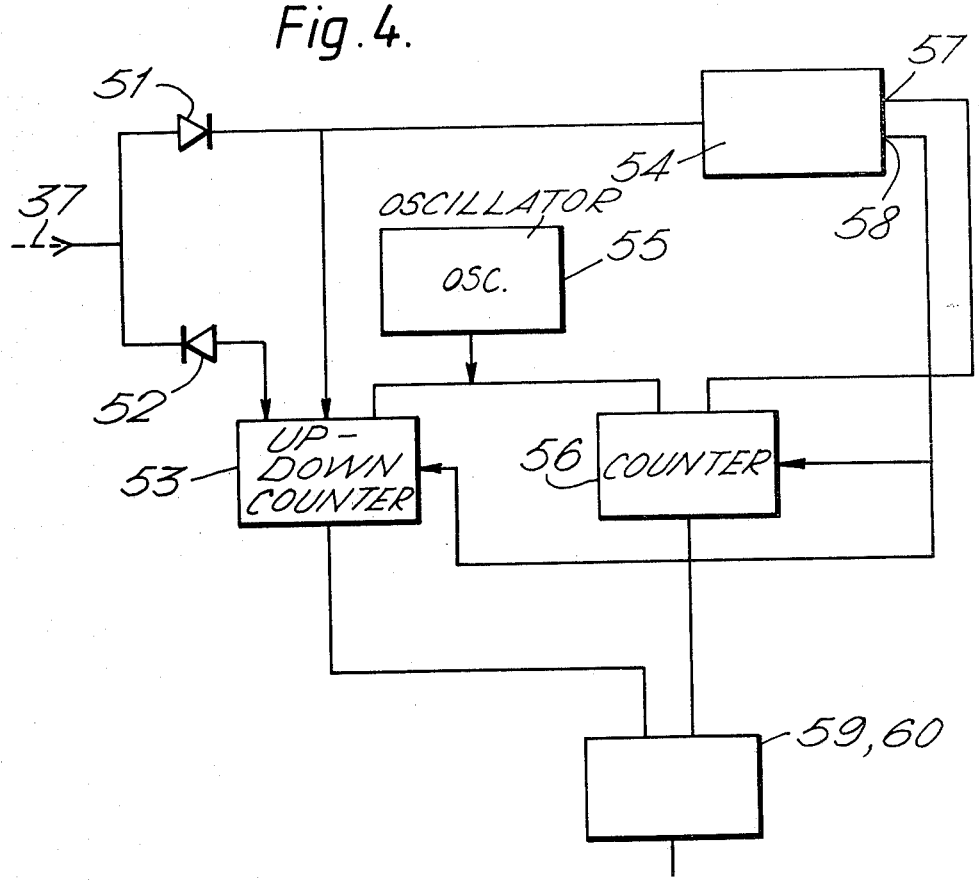
FIG. 4 is a block diagram of a circuit for producing an acceleration related signal in pulse digital form.

As indicated above the acceleration related signal may be presented in analogue form by smoothing the voltage appearing across the load resistor LR in FIG. 2 in a smoothing circuit (not shown) or in pulse digital form. A circuit for calculating $(T_1-T_2)/(T_1+T_2)$ to give an output in pulse digital form as shown in FIG. 4. The output terminal 37 (FIG. 2) is connected to a pair of oppositely poled diodes 51, 52 to give signal paths of opposite polarity. Diode 52 is connected to a "down" control input of an up-down counter 53. Diode 51 is connected to an "up" control input of counter 53 and to a trigger input of a bistable circuit 54. An oscillator 55, providing pulses at much higher frequency than the oscillation of the accelerometer coil, is connected to feed pulses to the up-down counter 53 and to a counter 56. The counter 56 is arranged to be controlled to count pulses by a set output appearing at terminal 57 of the bistable 54. A reset terminal 58 is connected to both counters 53 and 56 to reset them. The set terminal of the bistable is connected to control gates 59 and 60 to apply the totals contained in counters 53 and 56 respectively to a division circuit 61. Assuming that for each time interval $T_1$ a positive signal is applied and for each time interval $T_2$ a negative signal is applied, then at the start of each coil oscillation period a positive signal is applied which sets the bistable 54 to give a set output. Both counters 53 and 56 receive control signals to count oscillator 55 pulses. At the end of interval $T_1$, the signal changes polarity and counter 53 counts down until the next positive going signal resets bistable 54 giving an output at 58 and preventing the count of further pulses until the bistable is set at the start of the next oscillation period. The reset output signal clears the counters of the values contained therein and passes them to a division circuit 59 to give an output, for alternate oscillations of the accelerometer coil, related to $(T_1-T_2)/(T_1+T_2)$ and thus independent of coil oscillation frequency.

Where it is desired to measure velocity or distance by integration of the accelerometer signal a pulse digital signal so produced is conveniently integrated by summating the pulses produced in each oscillation period over a number of periods.

Where a pulse digital output is required for further digital processing it may be preferred to utilise a lower coil oscillation frequency than is attainable by the device by employing a deliberately "Slow" switching means, for example, without amplifier feedback network 40. An alternative method of providing a digital output is to obtain an analogue output by oscillating the coil at high frequency and applying the smoothed average output to conventional analogue-to-digital converter.

It will be appreciated tha the accelerometer described above in its various embodiments is a linear single axis accelerometer and may be employed with others arranged with their sensitive axis at right angles to measure acceleration components in two or three directions. The above described single axis accelerometers may be adapted to measure acceleration along more than one axis by providing a suitable number of coil assemblies each with its own switching means, although it may be possible to share some components, such as the radiation source, between switching means.

Referring to FIG. 5(a) the cylindrical magnet core 13 and body 11 creates a uniform magnetic field in the annular airgap 12 between them. The coil assembly 17 pivoted at 16 has a centre of mass in the plane of the coil and is sensitive to an acceleration in a direction x. A coil assembly 67 is pivoted about an axis 68 parallel to the longitudinal axis of the core but carries an inertial mass 69 displaced out of the plane of the coil assembly to render it sensitive to acceleration in the direction z. The amplitude of oscillation is so small that the coils do not interfere with each other while both remaining in the uniform field.

FIG. 5(b) shows another two-coil arrangement in which a first coil assembly 17 is arranged as before. The second coil assembly 70 is pivoted about an axis 71 at right angles to the first. The coil still passes through the field perpendicularly to it such that in small amplitude oscillations of the coil it moves substantially perpendicularly to the field. The axis of rotation is displaced from the centre of the coil such that the mass of the coil assembly in the plane of the coil comprises the inertial mass and is sensitive to an acceleration in a direction y at right angles to the sensitivity of coil assembly 17 to acceleration in direction x.

FIG. 5(c) shows an arrangement in which two coil assemblies are arranged side-by-side to pivot about axes orthogonal to the longitudinal axis of the core 13. The coil assembly 70 is pivotted about axis 71 and the second coil assembly 72 is pivotted about axis 73, the inertial mass 74 being displaced out of the plane of the coil. The coil assembly 70 is sensitive in the y-direction and coil assembly 72 is sensitive in the z-direction.

FIG. 5(d) shows an arrangement combining the features of FIGS. 5(b) and 5(c) into a three-axis accelerometer sensitive to accelerations in the x-, y- and z-directions.

It will be appreciated that with suitable miniaturisation of the switching means a compact device can be formed.

What we claim is:

1. A force balance accelerometer comprising core means for producing a magnetic field, an electric coil assembly forming at least a part of an inertial mass, pivotally mounted in the field for rotation substantially perpendicular to the field about an axis also perpendicular to the field, a source of radiation for reflection from said core means and interrupted by said coil assembly, and electric switching means responsive to reflected radiation, arranged to be in a first state when the angular position of the coil is to one side of a switching position and in a second state when the coil is to the other side, said switching means being operable in the first state to cause a first substantially constant current to flow in the coil in a sense to rotate the coil in a direction to cause the switching means to enter the second state and operable in the second state to cause a second substantially constant current to flow in the coil in such a sense as to rotate the coil in a direction to cause the switching means to enter the first state.

2. An accelerometer as claimed in claim 1 in which the coil assembly has a center of mass in the plane of the coil and lying on the pivotal axis to be sensitive to angular rotation of the accelerometer about the pivotal axis.

3. An accelerometer as claimed in claim 1 in which the coil assembly has its centre of mass in the plane of the coil and displaced from the pivotal axis to cause the accelerometer to be sensitive to acceleration forces acting in a direction perpendicular to the plane of the coil at the switching position.

4. An accelerometer as claimed in claim 3 in which the coil is arranged with the pivotal axis displaced from the geometric centre of the coil assembly such that the coil assembly comprises the inertial mass of the accelerometer acting substantially at the geometric centre.

5. An accelerometer as claimed in claim 3 in which the coil assembly is arranged with the pivotal axis passing through the geometric centre of the coil assembly and the coil assembly carries an inertial mass in the place of the coil displaced from the pivotal axis.

6. An accelerometer as claimed in claim 1 in which the uniform magnetic field is formed within a cylindrical airgap between a cylindrical core and a surrounding body, the core comprising a magnet having one pair of diametrically opposed magnetic poles arranged to provide a substantially uniform field in the airgap in the vicinity each of said poles.

7. An accelerometer comprising core means for producing a magnetic field, an electric coil assembly forming at least a part of an inertial mass, pivotally mounted in the field for rotation substantially perpendicular to the field about an axis also perpendicular to the field, a source of radiation for reflection from said core means and interrupted by said coil assembly, and electric switching means responsive to reflected radiation, arranged to be in a first state when the angular position of the coil is to one side of a switching position and in a second state when the coil is to the other side, said switching means being operable in the first state to cause a first substantially constant current to flow in the coil in a sense to rotate the coil in a direction to cause the switching means to enter the second state and operable in the second state to cause a second substantially constant current to flow in the coil in such a sense as to rotate the coil in a direction to cause the switching means to enter the first state in which the switching means further comprises a detector of the radiation carried by a body, the detector being arranged to receive radiation reflected by a surface of a core means, the path between the reflected radiation and the detector being blocked or unblocked by reflection from the core by movement of the coil at a switching position to effect switching between the first and second states.

8. An accelerometer as claimed in claim 7 in which the surface of the core from which radiation is reflected carries a mirror to enhance reflection.

9. An accelerometer as claimed in claim 7 in which the switching means includes a further detector of radiation carried by the body and arranged also to receive reflected radiation unless the radiation is blocked by movement of the coil, said further detector being located such that movement of the coil assembly to block radiation to one detector unblocks radiation to the other detector and vice versa, the position of the coil at which this transition occurs defining the switching position.

10. An accelerometer as claimed in claim 9 in which the switching means includes a differential amplifier connected to receive signals from the detector and further detector at different inputs whereby the amplifier in operation provides an output signal which changes between two defined levels in dependence on whether the signal from one detector is greater than, or less than, the signal from the other detector.

11. An accelerometer comprising core means for producing a magnetic field, an electric coil assembly forming at least a part of an inertial mass, pivotally mounted in the field for rotation substantially perpendicular to the field about an axis also perpendicular to the field, a source of radiation for reflection from said core means and interrrupted by said coil assembly, and electric switching means responsive to reflected radiation, arranged to be in a first state when the angular position of the coil is to one side of a switching position and in a second state when the coil is to the other side, said switching means being operable in the first state to cause a first substantially constant current to flow in the coil in a sense to rotate the coil in a direction to cause the switching means to enter the second state and operable in the second state to cause a second substantially constant current to flow in the coil in such a sense as to rotate the coil in a direction to cause the switching means to enter the first state in which the switching means further comprises a detector of the radiation carried by a body, the detector being arranged to receive radiation reflected by a surface of a core means, the path between the reflected radiation and the detector being blocked or unblocked by reflection from the core by movement of the coil at a switching position to effect switching between the first and second states in which the switching means includes a differential amplifier connected as a comparator, one input of the amplifier being connected to the detector to receive signals therefrom and the other input of the amplifier being connected to a predetermined threshold signal level whereby the amplifier in operation provides an output signal which changes between two defined levels in dependence on whether the detector signal is greater than, or less than, the threshold level.

12. An accelerometer as claimed in claim 11 in which said defined levels of amplifier output signal are arranged to be voltages of opposite polarity with respect to earth and in which the switching means includes coil driving means comprising a pair of transistors of different conductivity type connected between supply rails of opposite polarity with respect to earth, each transistor being arranged to be biased into conduction by a corresponding polarity of amplifier output signal to supply driving currents from the associated supply rail to one terminal of the coil, the other terminal of the coil being connected to an output terminal.

13. An accelerometer as claimed in claim 12 in which the amplifier includes a positive feedback loop including a reactive component.

14. An accelerometer as claimed in claim 12 in which the driving means includes compensation means comprising two impedance paths in parallel with the coil each path including an assymetric conducting element oppositely poled with respect to the other and an impedance adjustable in value with respect to the other to balance the magnitude of current flow in the coil in both directions.

15. A force balance accelerometer comprising means for producing a magnetic field, an electric coil assembly forming at least a part of an inertial mass, pivotally mounted in the field for rotation substantially perpendicular to the field about an axis also perpendicular to the field and electric switching means, arranged to be in a first state when the angular position of the coil is to one side of a switching position and in a second state when the coil is to the other side, said switching means being operable in the first state to cause a first substantially constant current to flow in the coil in a sense to rotate the coil in a direction to cause the switching means to enter the second state and operable in the second state to cause a second substantially constant current to flow in the coil in such a sense as to rotate the coil in a direction to cause the switching means to enter the first state in which the coil assembly has its center of mass in the plane of the coil and displaced from the pivotal axis to cause the accelerometer to be sensitive to acceleration forces acting in a direction perpendicular to the plane of the coil at the switching position including a second coil assembly, also pivotally mounted in the field for rotation substantially perpendicular to the field, and associated electric switching means said second coil assembly having an inertial mass displaced from its axis of rotation and responsive to an acceleration force acting in a direction perpendicular to one to which the first coil assembly is sensitive.

16. An accelerometer as claimed in claim 15 in which first and second coil assemblies are pivotally mounted in the field for rotation substantially perpendicular to the field, and associated electric switching means said third coil assembly having an inertial mass in the plane of the coil.

17. An accelerometer as claimed in claim 16 including a third coil assembly, also pivotally mounted in the field for rotation substantially perpendicular to the field and associated electric switching means said third coil assembly having an inertial mass displaced from its axis of rotation and responsive to an acceleration force acting in a direction mutually perpendicular to directions in which the first and second coil assemblies are sensitive.

18. An accelerometer as claimed in claim 17 in which the second and third coil assemblies are pivotally mounted for rotation about axes parallel to each other.

* * * * *